(12) United States Patent
Zelenov et al.

(10) Patent No.: US 10,698,931 B1
(45) Date of Patent: Jun. 30, 2020

(54) INPUT PREDICTION FOR DOCUMENT TEXT SEARCH

(71) Applicant: Parallels International GmbH, Schaffhausen (CH)

(72) Inventors: Anton Zelenov, Moscow (RU); Nikolay Dobrovolskiy, Moscow (RU); Serguei M. Beloussov, Singapore (SG)

(73) Assignee: PARALLELS INTERNATIONAL GMBH, Schaffhausen (CH)

( * ) Notice: Subject to any disclaimer, the term of this patent is extended or adjusted under 35 U.S.C. 154(b) by 408 days.

(21) Appl. No.: 15/372,202

(22) Filed: Dec. 7, 2016

(51) Int. Cl.
*G06F 16/332* (2019.01)
*G06F 16/93* (2019.01)
*G06F 16/951* (2019.01)
*G06F 40/205* (2020.01)

(52) U.S. Cl.
CPC .......... *G06F 16/3322* (2019.01); *G06F 16/93* (2019.01); *G06F 16/951* (2019.01); *G06F 40/205* (2020.01)

(58) Field of Classification Search
CPC .... G06F 16/3322; G06F 16/93; G06F 16/951; G06F 17/2705; G06F 3/0237; G06F 17/277; G06F 17/2785; G06F 16/338; G06F 16/9535; G06F 17/28; G06F 16/248; G06F 16/332; G06F 16/3329; G06N 20/00; G06N 3/0454; G06N 5/04; G06N 5/025

USPC ........................................................ 707/706
See application file for complete search history.

(56) References Cited

U.S. PATENT DOCUMENTS

| | | | |
|---|---|---|---|
| 9,959,584 B1* | 5/2018 | Frank | G06Q 10/10 |
| 2009/0043741 A1* | 2/2009 | Kim | G06F 16/3322 |
| 2014/0280107 A1* | 9/2014 | Heymans | G06F 16/9535 707/727 |
| 2014/0358957 A1* | 12/2014 | Chang | G06F 15/177 707/767 |
| 2017/0091198 A1* | 3/2017 | Zhang | G06F 16/3322 |
| 2017/0192991 A1* | 7/2017 | Touma | G06F 16/3322 |
| 2018/0101599 A1* | 4/2018 | Arnold | G06F 16/338 |

* cited by examiner

*Primary Examiner* — Evan Aspinwall
(74) *Attorney, Agent, or Firm* — Lowenstein Sandler LLP

(57) ABSTRACT

A document search engine facilitates input prediction for searching content within stored documents associated with a user by maintaining a data structure comprising entries that are each associated with one of the stored documents, wherein each entry comprises textual content of one of the stored documents, and wherein the textual content comprises a plurality of characters. The textual content of each entry in the data structure is analyzed to identify sequential relationships between the characters in the textual content. An input text comprising a text character is received from a user as part of a search query, and a predicted text to follow the input text is determined, where the predicted text is based on the one or more sequential relationships between the characters in the textual content. The document search engine then provides the search query including the input text and the predicted text to the client device.

21 Claims, 7 Drawing Sheets

> US 10,698,931 B1

INPUT PREDICTION FOR DOCUMENT TEXT SEARCH

TECHNICAL FIELD

Embodiments of this disclosure relate generally to computer systems and, more specifically, relate to input prediction for searching the contents of documents in computer systems.

BACKGROUND

A search engine is a computer system that is configured to search for information, either on a local network or on the Internet. Results of Internet searches can be presented via user interfaces in a list of results that may include lists of web pages, images, documents, or any other types of files. Results for document searches can be presented in a list of results that can include names of documents, storage locations of documents, text strings within documents, or the like. In some cases, search engines can mine data available for searching in databases accessible to the search engine to build an index for improving performance and quality of results. Search engine indexing collects, parses, and stores data to facilitate information retrieval. Some search engines utilize prediction algorithms to predict a user's search query as it is typed based on popular searches entered by other users. This technique is commonly referred to as "predictive search."

BRIEF DESCRIPTION OF THE DRAWINGS

Embodiments of the present disclosure will be understood more fully from the detailed description given below and from the accompanying drawings, which, however, should not be taken to limit the present disclosure to the specific embodiments, but are for explanation and understanding only.

DETAILED DESCRIPTION

Figure 1:
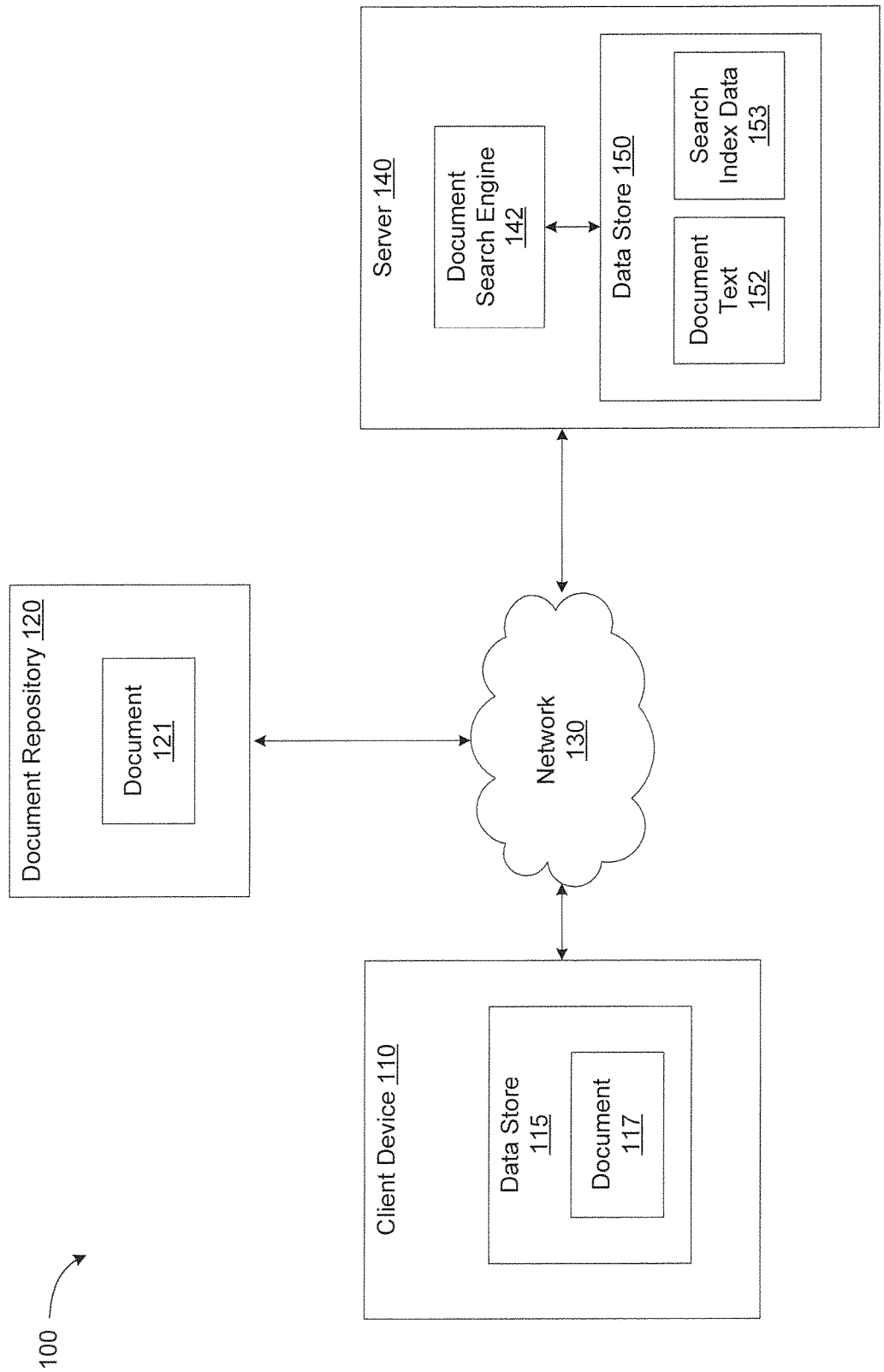
FIG. 1 is a block diagram illustrating a networked environment in which embodiments of the present disclosure may be implemented.

Described herein are, methods and systems for enabling and implementing input prediction for searching the content within documents stored in a document repository. Search engines may collect information by accessing data from websites, document repositories, etc., and parsing that data to build a search index. Search engines may use predictive search to assist a user with e g useful search queries to identify results of interest. Some predictive search algorithms predict a user's search query as it is typed based on stored popular searches of other users of the search engine. Typically, the search engine provides a list of suggestions that changes as the user adds more characters to the search input.

While predictive search may be a useful tool for general internee searching, the list of suggestions often fail to take into account information specific to the user entering the search query text. Since predictive search looks for popular queries entered by users across the search engine, a particular user's interests may be discarded in favor of the activity of the entire user population. Additionally, while predictive search can be effective in predicting queries based on other popular queries, typical search engines do not provide predictions based on the content of a user's own stored documents. Moreover, predictive search implementations do not typically take into account intended use of language by a particular user within stored documents. Typically, input fields of search engines correct spelling of common words based on previously entered queries. Thus, conventional predictive search implementations may ignore the spelling or context of a user's input in favor of that which is commonly used across the search engine population.

Aspects of the present disclosure address the above noted and other deficiencies by providing a document search engine to facilitate input prediction for searching the content (e.g., the text) within a plurality of stored documents associated with a user. In one embodiment, a document search engine application on a server device maintains a data structure that includes entries for stored documents associated with a user, where each entry includes the textual content from a respective document. The document search engine can maintain the data structure by obtaining a document from a document repository, parsing the document to identify its textual content, generate a unique identifier associated with the document's location, determine a unique identifier associated with the user associated with the document, and store the information in a data structure. The textual content may then be analyzed by a prediction engine to identify the sequential relationships between the characters within the textual content of the user's stored documents. Subsequently, the document search engine may receive input text entered by the user to search the content of the stored documents. The document search engine may determine a predicted text to follow the input text where the predicted text is based on the sequential relationships between the characters in the textual content.

Aspects of the present disclosure are thus capable of providing input prediction for searching the content (e.g., the text) within stored documents that is based on the actual content of those stored documents. Thus, the document search engine can provide suggestions that are more relevant to the user entering the query, rather than suggestions that are most popular among users of the search engine. In particular, unlike conventional techniques, the document search engine of the present disclosure may take into account the context of words and phrases as used within the user's stored documents by analyzing the text of those stored documents, rather than only utilizing the conventional spelling and usage of terms and phrases. This can provide a significantly more efficient method of generating suggested input text for queries entered by users searching their own documents. Thus, the document search engine of the present disclosure can improve the efficiency of searching the contents of documents by providing predictive search that is most relevant to the actual contents of the documents being searched, thereby reducing the amount of time a user may need to expend on that search.

FIG. 1 is a block diagram illustrating a networked environment 100 in which embodiments of the present disclosure may be implemented. The networked environment 100 can include one or more client devices 110, one or more servers 140, and one or more document repositories 120, which can be in data communication with each other via network 130. Computer system 700 illustrated in FIG. 7 may be one example of any of client devices 110 or servers 140. The network 130 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

Client devices 110 may include processor-based systems such as computer systems. Such computer systems may be embodied in the form of desktop computers, laptop computers, personal digital assistants, cellular telephones, smartphones, set-top boxes, music players, web pads, tablet computer systems, game consoles, electronic book readers, or other devices with similar capability. In one embodiment, client device 110 includes a data store 115 that stores one or more documents 117 for a user of the client device.

Client device 110 may communicate with one or more document repositories 120 that may store documents (e.g., documents 121) for the user of the client device. In some implementations, document repository 120 may be a local document storage system within local area network. For example, document repository may be a file system accessible via a network attached storage (NAS) system, a shared network directory 120, or the like. In some implementations, document repository 120 may be a cloud based document storage system that is accessible to client device 110 via the Internet. For example, document repository 120 may be Dropbox®, Google Drive®, Apple's iCloud Drive®, Amazon Drive®, or any other similar cloud-based storage system. Although, for simplicity, only one document repository 120 is depicted, in some embodiments, client device 110 may communicate with multiple document repositories 120.

Documents 117, 121 may be any type of document that includes text that may be indexed for a search engine. For example, documents 117, 121 may include a word processing document, a presentation document, a spreadsheet, an image that has been processed by optical character recognition (OCR) to embed text with the image, a markup document (e.g., hypertext markup language (HTML), extensible markup language (XML), etc.), or the like. In some implementations, documents 117, 121 may also include text messages, online chat transcripts, email messages, or any other similar type of document. In various embodiments, the text within documents 117, 121 may include multiple characters that may in turn form multiple words.

Server 140 may include, for example, a server computer or any other system providing computing capability. Alternatively, server 140 may employ a plurality of computing devices that may be arranged, for example, in one or more server banks or computer banks or other arrangements. Such computing devices may be positioned in a single location or may be distributed among many different geographical locations. For example, server 140 may include a plurality of computing devices that together may comprise a hosted computing resource, a grid computing resource and/or any other distributed computing arrangement. In some cases, server 140 may correspond to an elastic computing resource where the allotted capacity of processing, network, storage, or other computing-related resources may vary over time.

In some implementations, server 140 can include a document search engine 142 and a data store 150. Document search engine 142 can manage the parsing, analyzing, and searching of documents 117 stored on client device 110 and/or documents 121 stored in document repositories 120 in order to facilitate input prediction for searching the content (e.g., the text) within documents 117, 121. In some implementations, document search engine 142 may be invoked via a request received from a user of client device 110. The user may interact with the document search engine 142 via a graphical user interface on client device 110 to initiate analyzing and indexing of the user's documents stored either locally on client device 110 or in document repository 120, and subsequently initiate searches of those documents.

In some implementations, server 140 can include a data store 150 that may store document text 152 and search index 153. Data store 150 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

Document text 152 may be a data structure that stores entries that are each associated with one of the user's documents 117 stored on client device 110 or documents 121 stored in document repository 120. Document text 152 may be maintained by document search engine 142 to facilitate input prediction for searching the content (e.g., the text) within the user's documents as described further herein. Document text 152 may include multiple entries, each associated with one of the user's stored documents analyzed and indexed by document search engine 142, where each entry includes the textual content of one of the user's documents. In some implementations, a single entry may contain the entire textual content of a single document. Alternatively, the textual content of a single document may be made up of multiple entries that are linked together. Each entry may additionally include a unique document identifier associated the location of the document, a unique identifier associated with the user associated with the document or other similar identifying information. Document text 152 may be stored as a database of text content, a linked list, a log based data structure, or in any similar manner.

In an illustrative example, document search engine 142 can initiate the analysis and indexing of documents 117, 121. In some implementations, document search engine 142 may receive a notification from a user interface of client device 110 to initiate the indexing of documents 117, 121. Alternatively, a component of document search engine 142 may execute independently of client device 110 as a background task of server 140 to monitor the contents of data store 117 and/or document repository 120 and initiate indexing of a new document added to either repository, an existing document that is modified, or the like.

Document search engine 142 may obtain a document from data store 117 and/or document repository 120 and load the document into a memory space of server 142 for processing. Alternatively, document search engine 142 may load the document into temporary storage on server 142. Once the document has been obtained, document search engine 142 may then parse the document to extract the textual content from the document, generate a unique document identifier associated with the location of the document, determine a unique user identifier associate with the user, and store the information in document text 152.

In some implementations, the unique document identifier may indicate the storage repository 120 that stores the document. Additionally or alternatively, the unique identifier may indicate the location within the document repository 120 (or the location in the data store 115 on client device 110) where the document is stored (e.g., the directory structure within the file system). For example, the unique identifier may include a uniform resource locator address (URL) of the document within document repository 120. In one embodiment, the unique identifier may be a hash value of the location information, which may then be encoded to generate an encrypted hash value.

In some implementations, document search engine 142 may additionally extract document metadata from each document obtained. The document metadata may include the document title, author, date/time the document was created, or the like. Document search engine 142 may then index the textual content, the document metadata, unique document identifier, and document location to generate search index data 153 to be used to process subsequently received search queries of the textual content of the user's documents.

Document search engine 142 may then analyze the textual content in the data structure to identify one or more sequential relationships between the characters in the textual content for the user's documents. In an illustrative example, document search engine 142 may analyze the textual content by training a prediction engine of server 140, such as a recurrent neural network (RNN), using the textual content in document text 152. The prediction engine may be trained with the textual content to identify any sequential relationships between the characters in the textual content.

An RNN is a type of neural network architecture where sequential input data streams may be analyzed to determine relationships between the data within the input streams. In particular, an RNN may be used to analyze text strings to identify relationships between sequential patterns of characters within the text strings. In some implementations, the RNN may additionally analyze the contextual relationships between words in the text based on the sequential patterns of the characters that form the words. Thus, by analyzing the textual content using an RNN to determine character sequence patterns, document search engine 142 may determine common sequences of words and the context of word usage within the textual content of a user's documents. Document search engine 142 may later use this information to predict text strings that a user may use to issue search queries of the contents of the user's documents.

Once the textual content has been analyzed by the prediction engine, document search engine 142 may subsequently receive input text from the client device. The input text may be entered by the user into a user interface that is presented on client device 110. The user interface may present an input field for the user to enter a search string to search the content (e.g., the text) within documents stored either locally or in document repository 120. The user interface may be an application executing on the client device 110, a browser window, or the like. Document search engine 142 may then send the input text received to the prediction engine (e.g., the RNN) to determine a predicted text string to follow the input text based on the identified sequential relationships between the characters of the stored textual content in document text 152.

Once a predicted text string has been determined, document search engine 142 may provide the predicted text to client device 110. In some implementations, document search engine 142 may update the predicted text each time a user enters a single character into the user interface. For example, if a user enters the character "o" into the input field, and the user maintains a library of documents in the document repository that includes the text string "once upon a time," document search engine 142 may return a predicted text string to the input field that includes an "n". Alternatively, document search engine 142 may return a predicted text string to the input field that completes the word "once" by returning "nce."

Document search engine 142 may determine the complete word by determining the predicted text character by character until encountering a space in the predicted text (e.g., indicating the end of a word). Thus, document search engine 142, upon receiving the letter "o" may determine a series of characters based on the relationships between characters in the textual content that were identified during the training process. Document search engine 142 may determine subsequent characters one a time until identifying a space based on the character relationships (e.g., "n" then "c" then "e" then a space). Once a space is identified, document search engine 142 may return the characters "nce" to complete the word "once." In some implementations, the number of characters predicted may be configurable such that document search engine 142 may additionally include the most commonly occurring words that follow "once" in the user's documents. Thus, document search engine 142 may return "nce upon a time".

Subsequently, document search engine 142 may receive a search query from the client device 110 that may or may not include the predicted text string. Document search engine 142 may then access search index data 153 to identify the documents that include the string in the search query (e.g., any document whose textual content includes the search query string), and return the results to client device 110. In some implementations, the search results may include metadata associated with the document (e.g., document title) as well as the location of the document (e.g., the URL for the document within the document repository, the location of the document on the client device, etc.). Document search engine 142 is described in further detail below with respect to FIG. 2.

Figure 2:
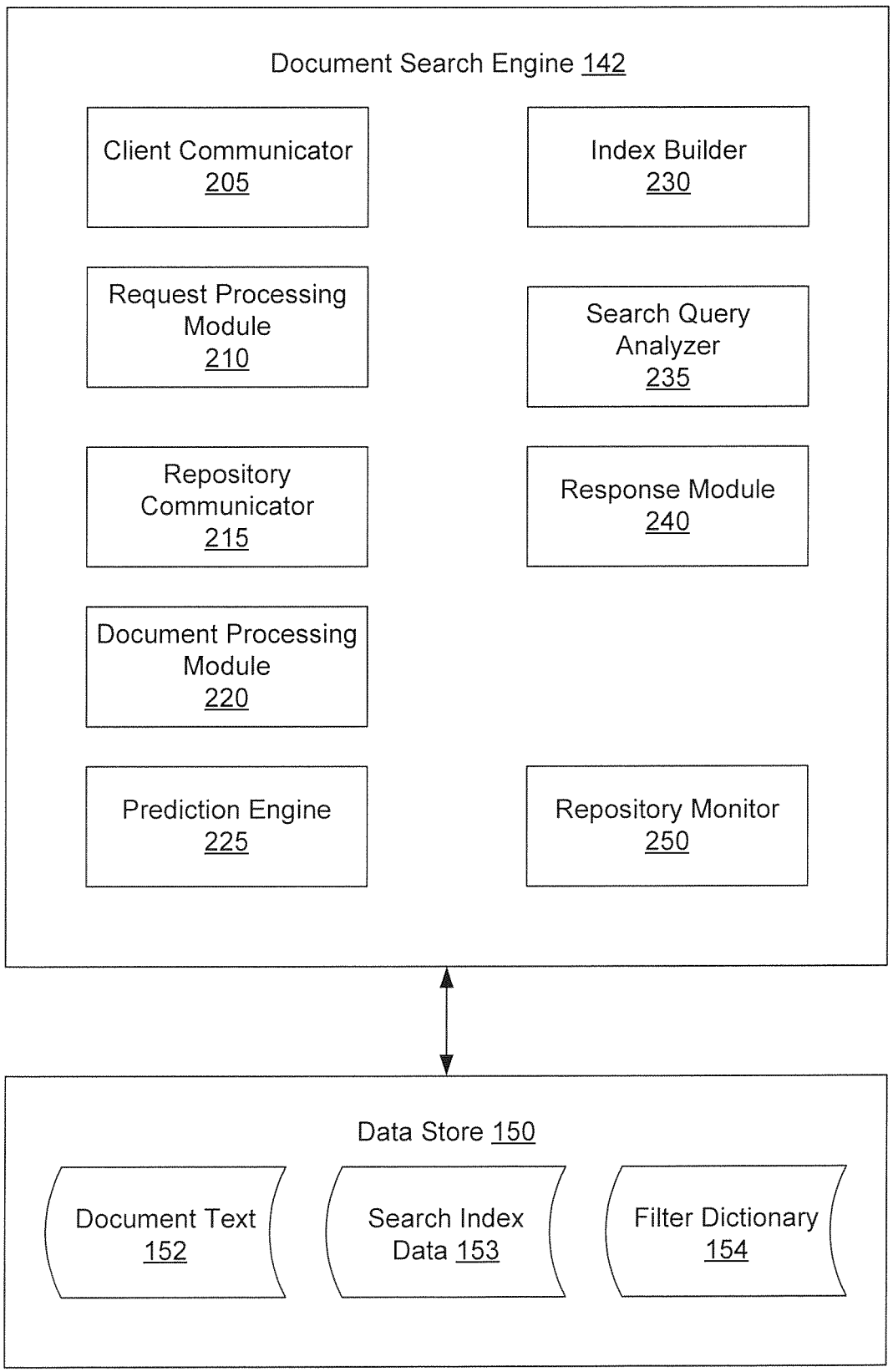
FIG. 2 is a block diagram illustrating a document search engine, according to an embodiment.

FIG. 2 is a block diagram of one embodiment of a document search engine 142 showing logical modules that may be loaded into and executed by a processing device of server device. In one embodiment, document search engine 142 corresponds to document search engine 142 of server 140 of FIG. 1. In some implementations, document search engine 142 can include user client communicator 205, request processing module 210, repository communicator 215, document processing module 220, prediction engine 225, index builder 230, search query analyzer 235, search results module 240, response module 245, and repository monitor 250. This arrangement of modules and components may be a logical separation, and in other embodiments, these modules or other components can be combined together or separated in further components. In some implementations, the components of document search engine 142 may be included on a single server (e.g., server 140 of FIG. 1). Alternatively, the components of document search engine 142 may be divided across multiple servers.

In some implementations, data store 150 may be connected to document search engine 142, and can include document text 152, search index data 153, and filter dictionary 154. In one embodiment, a single server (e.g., server 140 of FIG. 1) may include document search engine 142 and data store 150. In another embodiment, data store 150 may be on a different server from that of document search engine 142, and may be connected over a network or other connection.

In an illustrative example, document search engine 142 may maintain document text 152 that includes entries that are each associated with one of the user's documents stored on client device in a document repository. Document text 152 may include multiple entries, each associated with one of the user's stored documents analyzed and indexed by document search engine 142, where each entry includes the textual content of one of the user's documents. As noted above, each entry may contain the entire textual content of a single document. Alternatively, the textual content of a single document may be made up of multiple entries that are linked together. Each entry may additionally include a unique document identifier associated the location of the document, a unique identifier associated with the user associated with the document or other similar identifying information. Document text 152 may be stored as a database of text content, a linked list, a log based data structure, or in any similar manner.

To maintain document text 152, document search engine 142 obtains a user's documents from a client device data store or a document repository, parses the documents, and extracts the textual content from those documents. Client communicator 305 may receive a request from a client device to initiate the process. Client communicator 305 may be invoked by a communication request sent by the user interface of a client device (e.g., client device 110 of FIG. 1). The user interface may be a window, a dialog box, a prompt for textual input, or the like. A user may enter a request to index one or more documents (e.g., documents 117, 121 of FIG. 1), which can cause the user interface module 205 to invoke request processing module 210 to process the request and begin analyzing and indexing the document.

Document processing may also be performed independently of a specific user request. For example, repository monitor 250 may monitor the contents of a document repository and initiate indexing of a new document added to the repository, an existing document that is modified, or the like. Alternatively, repository monitor 250 may receive a notification from the document repository that a document has been modified, and subsequently send a request to the document repository to obtain the document for processing.

Request processing module 210 may receive information from the user to enable document search engine 142 to analyze and index the documents of a document repository. For example, request processing module 210 may receive the login credentials of the user for the document repository to grant document search engine 142 the authority to access the documents stored there. Request processing module 210 may then invoke repository communicator 215 to obtain access to the specified repository using the received credentials, and download a document to be processed. In one embodiment, the user may additionally specify the document to be indexed in the request. In another embodiment, repository communicator 215 may begin downloading documents based on user defined configuration. For example, repository communicator 215 may obtain the most recently added document, the most recently updated document, or the like. Once obtained, repository communicator 215 may load the document into a memory space (or temporary storage space) of server 140 and invoke document processing module 220 to process the document.

Document processing module 220 may parse the obtained document to extract textual content, where the textual content is made up of multiple characters. In some implementations, once the textual content has been extracted, document processing module 220 may perform one or more data processing operations on the textual content to normalize the text. For example, document processing module 220 may remove punctuation characters from the textual content, convert uppercase characters to lowercase characters, remove symbolic characters from the textual content, or the like.

Document processing module 220 may additionally generate a unique identifier associated with the location of the document in the document repository. In some implementations, the unique identifier may indicate the storage repository that stores the document. For example, the unique identifier may include a uniform resource locator address (URL) of the document repository, the Internet Protocol (IP) address of the document repository, or other similar identifying information. Additionally, the unique identifier may indicate the location within the storage repository or on a client device where the document is stored (e.g., the directory structure within the filesystem of the client device or document repository). In one embodiment, in order to store the location information as a fixed length, document processing module may generate the unique identifier as a hash value of the location information. In some implementations, document processing module 220 may store the unique identifier and the associated document location information in search index data 153 to be used when conducting future searches of the document.

Document processing module 220 may determine a unique user identifier associated with the user. For example, the unique user identifier may include a user authentication credential utilized by the user when accessing the document search engine 142 (e.g., a user sign-on). Alternatively, the unique user identifier may be an identifier associated with the client device that generated the request to index the user's documents. Document processing module 220 may subsequently store the textual content, unique document identifier, and unique user identifier in document text 152.

In some implementations, document processing module 220 may extract document metadata from each document processed. The document metadata may include the document title, author, date/time the document was created, or the like. Document processing module 220 may then invoke index builder 230 to index the textual content, the document metadata, unique document identifier, and document location to generate search index data 153 to be used to process subsequently received search queries of the textual content of the user's documents.

In some implementations, document processing module 220 may monitor the amount of textual content associated with a particular user that is stored in document text 152. Document processing module 220 may determine the amount of textual content each time a document is processed, or periodically based on a time interval. Responsive to determining that the amount of textual content stored in document text 152 that is associated with a particular user has met a predefined threshold amount, document processing module 220 may invoke prediction engine 225 to analyze the textual content for that user. The threshold amount may be a specific number of documents processed, a total amount of storage space occupied by the textual content (e.g., kilobytes, megabytes, terabytes, etc.), a total number of words in the document text 152, or the like.

Prediction engine 225 can identify one or more sequential relationships between the characters the textual content for the user's documents. In an illustrative example, prediction engine 225 may be a recurrent neural network (RNN) architecture that may be trained using the textual content in document text 152 to identify any sequential relationships between the characters in the textual content. In some implementations, prediction engine 225 may utilize cross-validation techniques to train against the textual content by analyzing a portion of the textual content for the user and simulating predictions for the remainder of the textual content based on the analyzed portion. Cross-validation is a technique for assessing how accurately a predictive model performs. Cross-validation is a way to predict how closely a data set "fits" a hypothetical validation set when an explicit validation set is not available. For example, prediction engine may analyze ⅔ of the text stored in document text 152 and use the remaining ⅓ as input text to test the accuracy of predictions. In some implementations, prediction engine 225 may implement cross-validation using a linear regression cost function algorithm to calculate a numerical difference between the predicted text and the validated data. If the calculated difference is within a threshold, then the prediction is determined to be accurate.

For example, a user that stores documents that include a set of fairy tales may have multiple documents that include the text "once upon a time." Prediction engine 225 can analyze these documents and determine that the character "o" is most often followed by the characters "nce" (yielding the word "once"). Similarly, prediction engine 225 can determine that the characters in the word "once" are most often followed by the characters "u," "p," "o," and "n" (yielding the word "upon") within that user's stored documents. Thus, prediction engine 225 can identify sequential relationships between the characters of words that appear in that user's stored documents.

Similarly, prediction engine 225 may identify particular word spellings, usage, or other contextual relationships between words of the textual content that are particular to that user. If a user stores documents that include words that are not in the dictionary or that would otherwise be identified by spelling correction software as misspelled, prediction engine 225 can retain the relationship between the words as they are used by the author rather than autocorrect them based on common spelling. For example, an author of science fiction may include the text "once upon altair" ("altair" being the name of a spacecraft) in a series of documents. Prediction engine 225, could recognize the occurrence of characters in this word within that user's documents and build an association between the characters in "altair" and the characters in "once upon". Thus, the user's particular usage of a word within sequences of characters that form commonly known phrases may be retained and used for future search predictions.

Subsequently, client communicator 205 may receive input text from a client device. The input text may be entered by a user as part of a search query via the user interface of the client device that is used to issue searches against the content (e.g., the text) of the user's stored documents. As the user enters the input text, client communicator 205 may invoke prediction engine 225 to determine a predicted text string to follow the input text based on the identified sequential relationships between the characters of the stored textual content in document text 152. As noted above, in some implementations, prediction engine 225 may be invoked to generate the predicted text string each time a user enters a single character. Continuing the "once upon a time" example from above, if a user enters the character "o" into the input field, prediction engine 225 may return a predicted text string to the input field that includes an "n" after the "o."

Alternatively, prediction engine 225 may return a predicted text string to the input field that completes the word "once" by returning "nce." In some implementations, prediction engine 225 may additionally return the received input character with the predicted text. Thus, after receiving the "o" and predicting the "nce," prediction engine 225 may return "once" to the client device.

Prediction engine 225 may continue to determine and provide the predicted text until identifying a space as the next most likely character based on the predetermined sequential relationships (e.g., indicating the end of a word). Thus, upon receiving the letter "o," prediction engine 225 may determine that the next sequential characters are most likely to be "n," "c," "e," and a space (yielding the word "once"). Once a space is identified as the next likely sequential character, prediction engine 225 may return the characters "nce" to complete the word "once."

In some implementations, the number of characters predicted may be configurable such that prediction engine 225 may additionally include the most commonly occurring words that follow "once" in the user's documents. Thus, prediction engine 225 may return "nce upon a time". Similarly, to continue the "altair" example from above, prediction engine may return "nce upon altair" rather than "upon a time" if "altair" was more frequently identified during the training process as occurring after "upon" in the text of the user's stored documents. In some implementations, prediction engine 225 may configured to monitor the length of the predicted text generated. Thus, if a space is not detected after a threshold number of characters have been predicted (e.g., a word has not yet been identified), prediction engine 225 may return an error message to the client device and/or re-execute the training process. For example, if the predicted text reaches a length of 20 characters without encountering a space, prediction engine 225 may send an error message to the client device. Alternatively, prediction engine 225 may re-execute the training process using the document text before sending any response to the client device.

In some implementations, prediction engine 225 may additionally access filter dictionary 154 to improve and or modify the predicted text. For example, the filter dictionary 154 may be used to filter out commonly misspelled words. Additionally or alternatively, filter dictionary may be used to filter out profanity, proprietary terms, proper nouns, or other similar information. An illustrative example of predicted text generation is depicted below with respect to FIG. 3.

Subsequently, request processing module 210 may receive a search query from the client device that may or may not include the predicted search string. Search query analyzer 235 may then be invoked to parse the query and identify any documents associated with the requesting user that include the text included in the query. Search query analyzer 230 may then access search index data 153 to identify the unique document identifiers for any documents associated with that user that include the text of the query. Search query analyzer 230 may additionally identify metadata associated with an identified document (e.g., document title) as well as the location of the document (e.g., the URL for the document within the document repository, the location of the document on the client device, etc.).

Response module 240 may be invoked to send a response to the client device. In various implementations, response module 240 may send the document identifier, the metadata, and/or the document location to the client device in response to the query.

Figure 3:
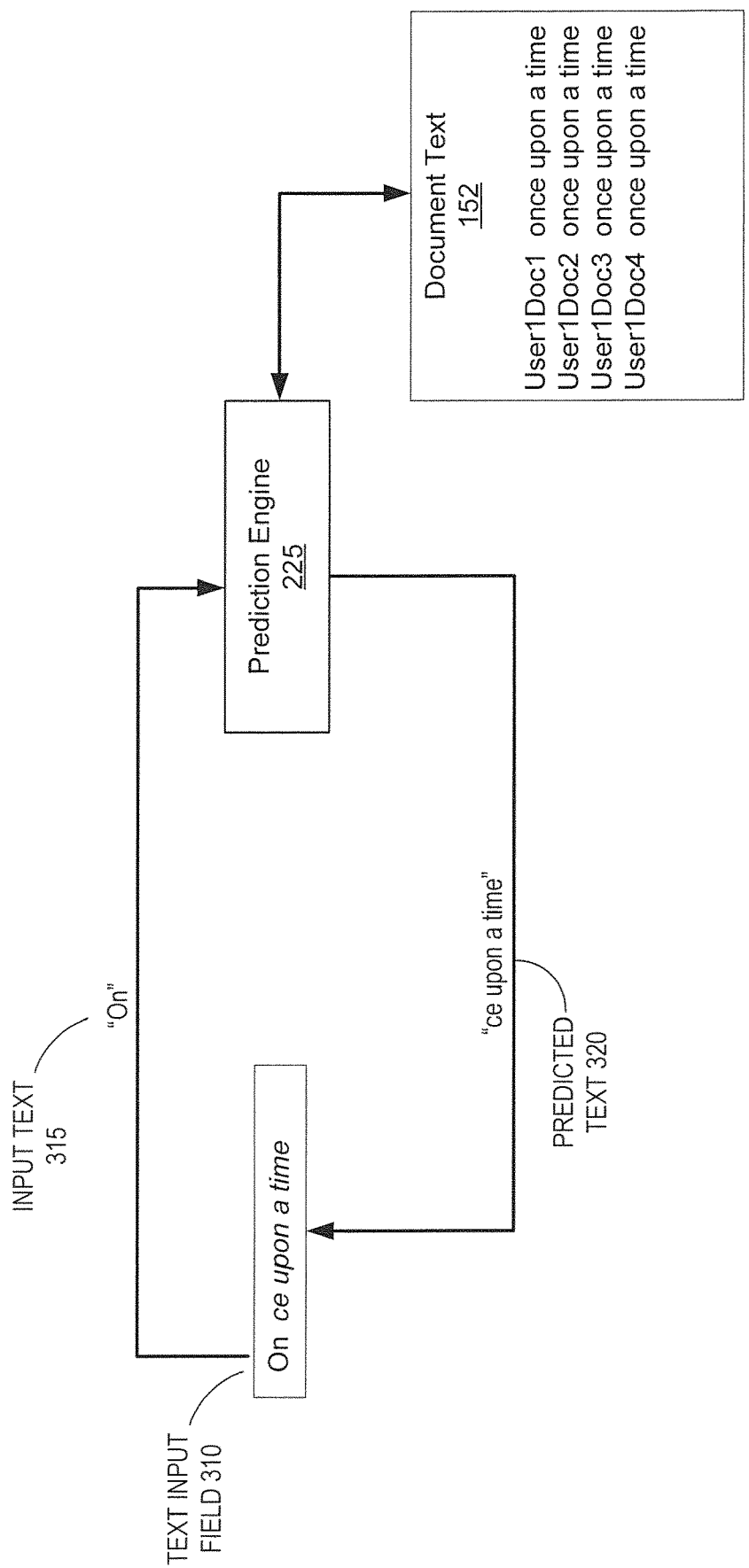
FIG. 3 is a block diagram illustrating an example of text input prediction, according to an embodiment.

FIG. 3 is a block diagram illustrating an example of text input prediction, according to an embodiment. As shown in FIG. 3, a user "User1" may enter input text "On" into a text input filed 310 of a user interface of a client device (e.g., client device 110 of FIG. 1). The client device then sends input text 315 ("On") to the prediction engine 225 of a server device (e.g., prediction engine 225 of document search engine 142 in FIG. 2). Prediction engine 225, responsive to receiving the input text 315, determines a predicted text 320 to follow the input text based on previous training against the contents of document text 152.

As shown, document text 152 includes the textual content for stored documents associated with User 1. Document text 152 includes four documents associated with User 1: "Doc1," "Doc2," "Doc3," and "Doc4," each of which include the text string "once upon a time". Thus prediction engine 225's training process may have established the sequential relationships between the characters forming the words in "once upon a time". Thus, upon receiving the input text 325, prediction engine 225 can generate predicted text 320 of "ce upon a time" to return to the text input field 310. Although not depicted, in alternative implementations, prediction engine 225 may combine the input text 325 and predicted text 320 into a combined response and send the combined response to text input field 310. Thus, the contents of text input field 310 may be replaced with the combined response.

Figure 4:
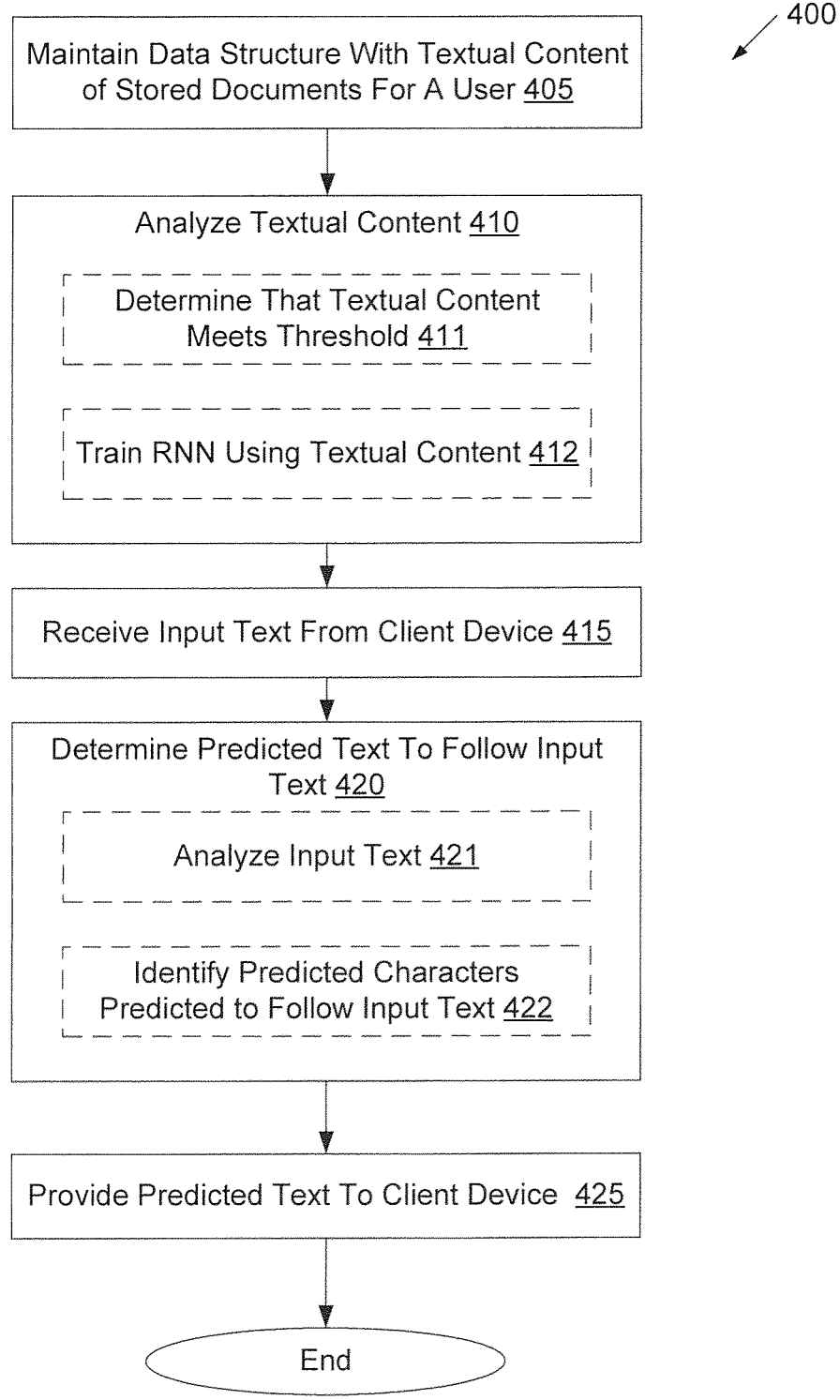
FIG. 4 is a flow diagram illustrating a method of facilitating input prediction for searching a plurality of stored documents associated with a user, according to an embodiment.
Figure 5:
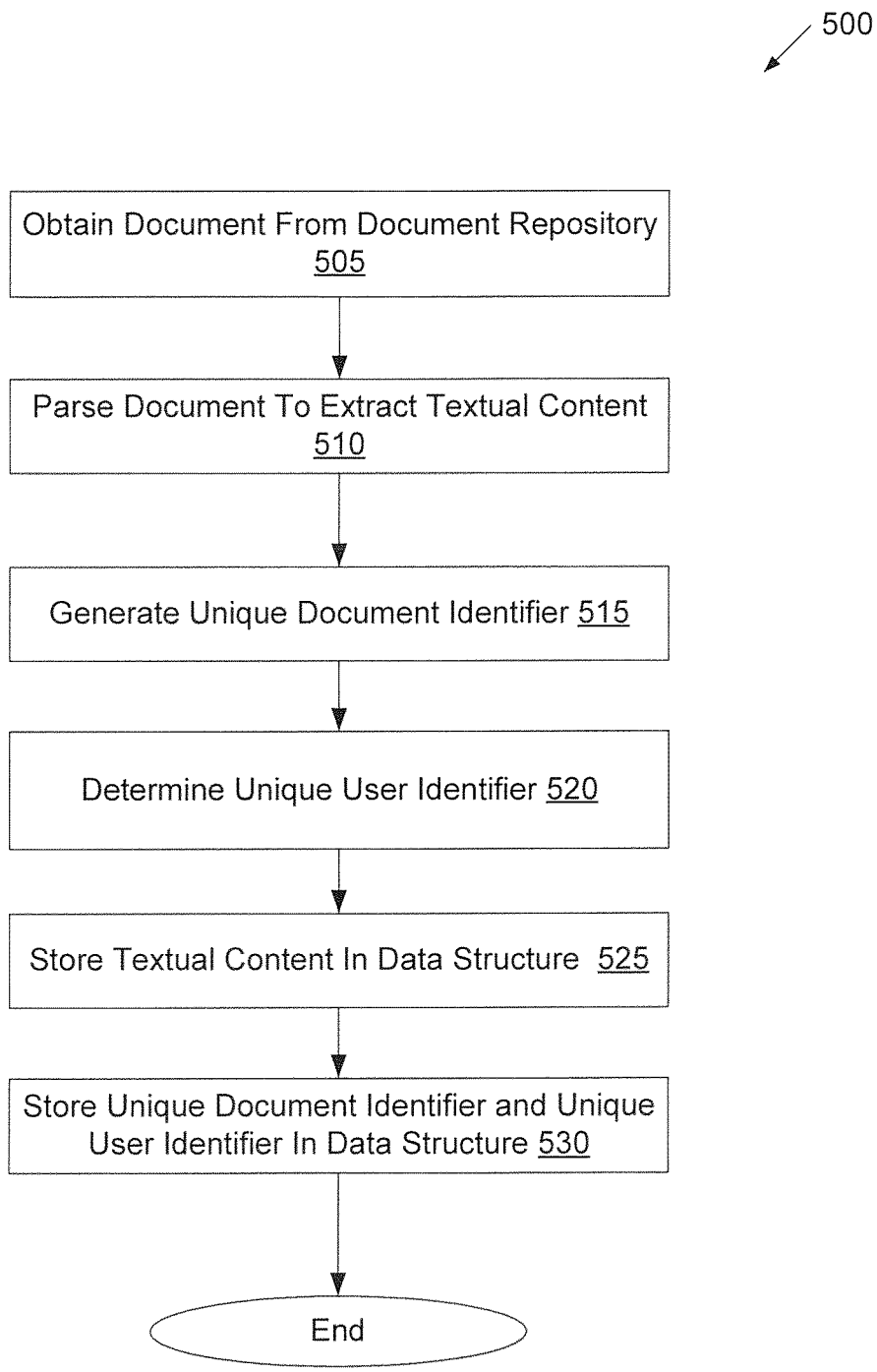
FIG. 5 is a flow diagram illustrating a method of maintaining a data structure of textual content, according to an embodiment.
Figure 6:
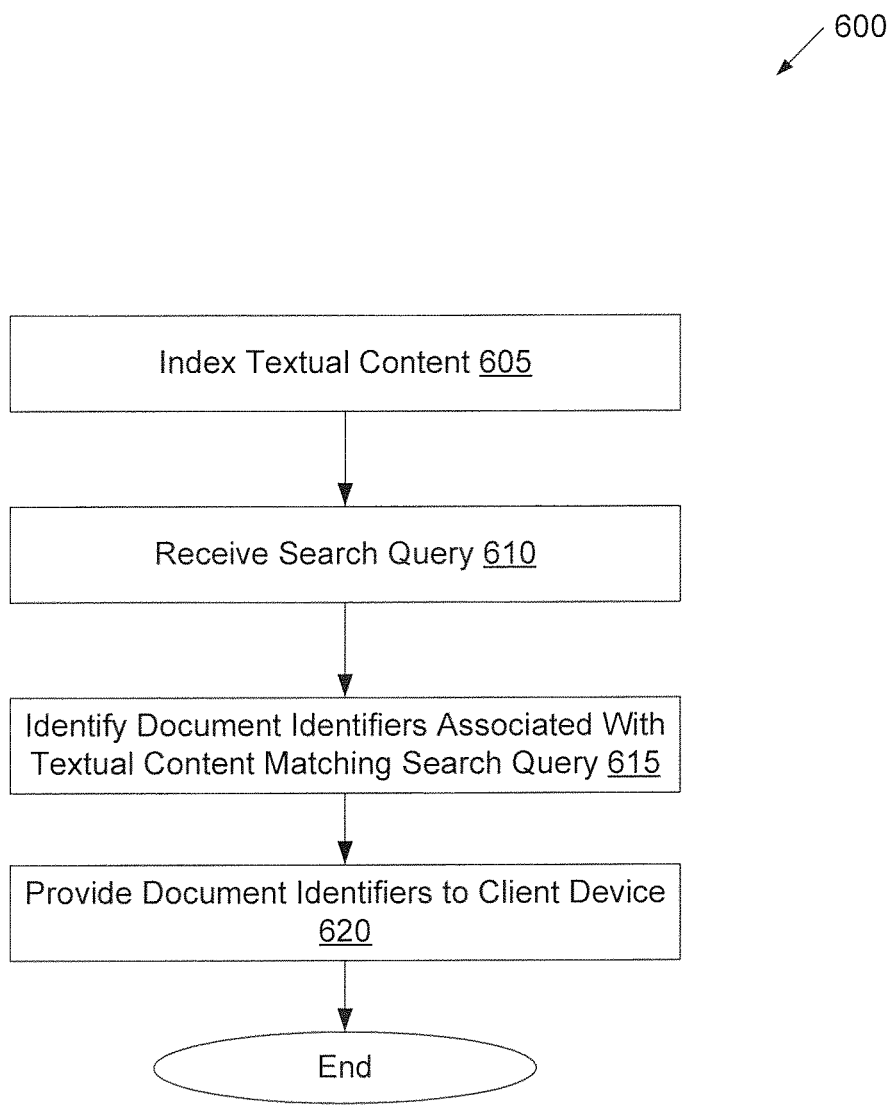
FIG. 6 is a flow diagram illustrating a method of processing a search query by a document search engine, according to an embodiment.

FIGS. 4-6 are flow diagrams of various implementations of methods related to input prediction for searching the contents of documents. The methods are performed by processing logic that may include hardware (circuitry, dedicated logic, etc.), software (such as is run on a general purpose computer system or a dedicated machine), or a combination of both. Some methods may be performed by a document search engine on a server such as document search engine 142 of FIGS. 1-2.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 4 is a flow diagram illustrating an embodiment for a method 400 of facilitating input prediction for searching the content within a plurality of stored documents associated with a user. At block 405 of method 400, processing logic maintains a data structure comprising entries that are each associated with one of the plurality of stored documents associated with a user, where each entry comprises textual content of a document of the plurality of stored documents, and where the textual content comprises a plurality of characters. In an illustrative example, processing logic may maintain the data structure as described below with respect to FIG. 5.

At block 410, processing logic analyzes the textual content of each entry in the data structure to identify one or more sequential relationships between the plurality of characters in the textual content. In some implementations, to analyze the textual content, processing logic may first invoke block 411 to determine that the amount of textual content associated with the user in the data structure meets a threshold. If so, processing logic may subsequently invoke block 412 to train a recurrent neural network using the textual content in the data structure to identify the one or more sequential relationships between the plurality of characters in the textual content.

At block 415, processing logic receives an input text from a client device entered by a user as a part of a search query, where the input text comprises a character. At block 420, processing logic determines a predicted text to follow the input text, where the predicted text is based on the one or more sequential relationships between the plurality of characters in the textual content. In some implementations, block 421 may be invoked to analyze the input text using the recurrent neural network. Block 422 may subsequently be invoked to identify one or more predicted characters that are predicted to follow the input text based on the recurrent neural network training. At block 425, processing logic provides the search query including the input text from block 415 and the predicted text from block 420 to the client device. After block 425, the method of FIG. 4 terminates.

FIG. 5 is a flow diagram illustrating an embodiment for a method 500 of maintaining a data structure of textual content. At block 505 of method 500, processing logic obtains a document of a plurality of stored documents from a document repository. At block 510, processing logic parses the document to extract textual content from the document. At block 515, processing logic generates a unique document identifier associated with a location of the document. At block 520, processing logic determines a unique user identifier associated with the user. At block 525, processing logic stores the textual content in a data structure. At block 530, processing logic stores the unique document identifier and unique user identifier in the data structure with the textual content of the document. After block 530, the method of FIG. 5 terminates.

FIG. 6 is a flow diagram illustrating an embodiment for a method 600 of processing a search query by a document search engine. At block 605 of method 600, processing logic indexes the textual content of a stored document to generate a search index to be used by a search engine to process queries of the textual content of the plurality of documents. At block 610, processing logic receives a search query from a client device to search the textual content of the plurality of documents associated with the user. In some implementations, the search query may include a predicted text generated by a prediction engine. At block 615, processing logic identifies one or more document identifiers associated with textual content matching the search query based on the search index. At block 620, processing logic provides the document identifiers associated with the textual content to the client device in response to the query. After block 620, the method of FIG. 6 terminates.

Figure 7:
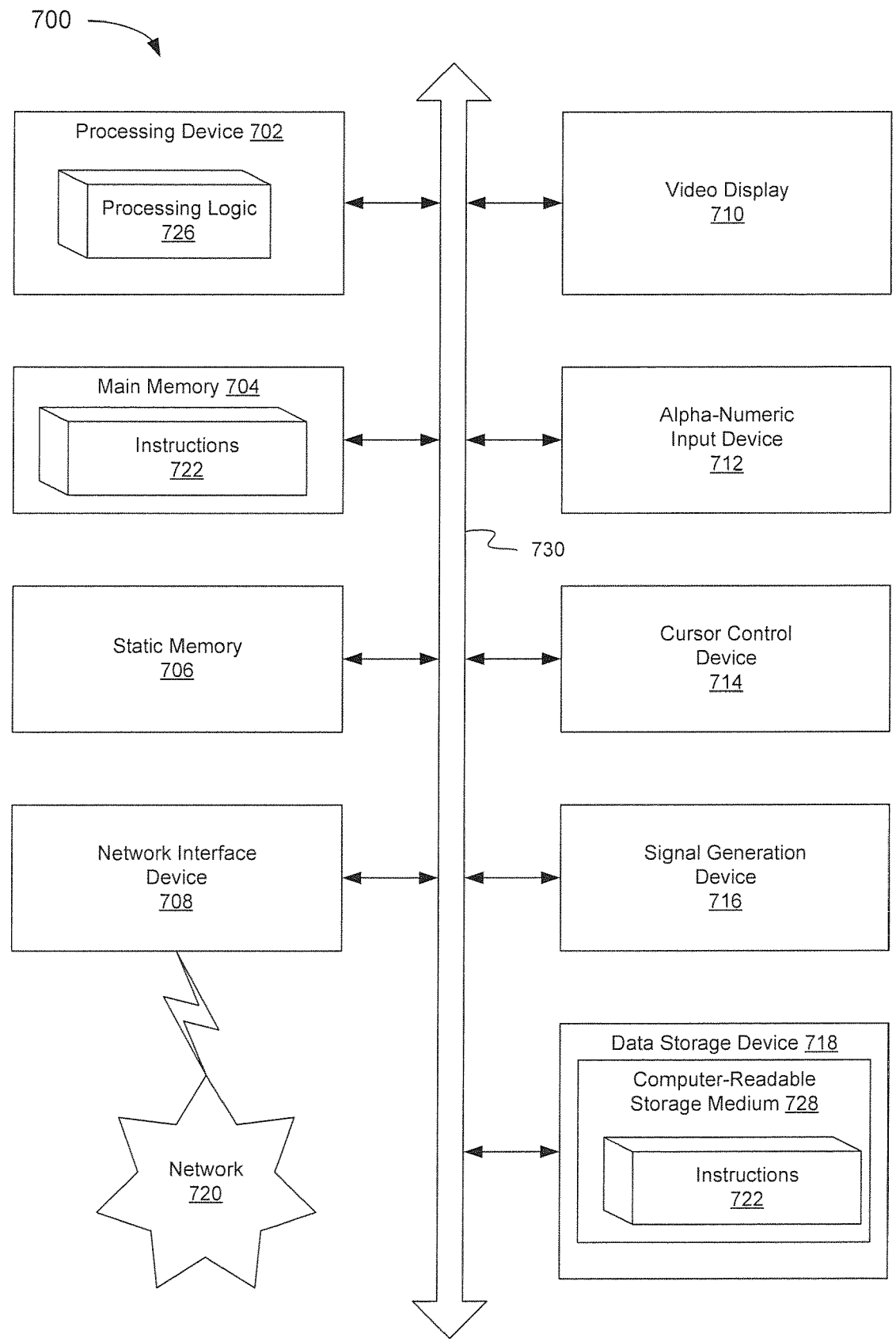
FIG. 7 is a block diagram illustrating an exemplary computer system, according to an embodiment.

FIG. 7 illustrates a diagrammatic representation of a machine in the exemplary form of a computer system 700 within which a set of instructions, for causing the machine to perform any one or more of the methodologies discussed herein, may be executed. For example, the instructions may cause the machine to perform asynchronous scanning using redirected scanners with a single driver. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may represent server 140 of FIGS. 1-2.

The exemplary computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein. In one embodiment, processing logic 726 is representative of document search engine 142 of FIGS. 1-2.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions 722 (e.g., instructions of document search engine 142) embodying any one or more of the methodologies or functions described herein. The instructions 722 may also reside, completely or at least partially, within the main memory 704 and/or within processing logic 726 of the processing device 702 during execution thereof by the computer system 700, the main memory 704 and the processing device 702 also constituting computer-readable media. The instructions may further be transmitted or received over a network 720 via the network interface device 708.

While the computer-readable storage medium 728 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "obtaining", "maintaining", "analyzing", "receiving," "identifying," "determining," "providing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method to facilitate input prediction for searching content of a plurality of stored documents associated with a user, the method comprising:
   maintaining, by a processing device, a data structure comprising entries that are each associated with one of the plurality of stored documents associated with the user, wherein each entry comprises textual content from a document of the plurality of stored documents associated with the user, and wherein the textual content comprises a plurality of characters;
   determining an amount of textual content stored in the data structure associated with the user;
   responsive to determining that the amount of textual content stored in the data structure associated with the user meets a threshold, analyzing, by the processing device, the textual content of each entry in the data structure to identify one or more sequential relationships between the plurality of characters in the textual content, wherein analyzing the textual content comprises training a neural network using the textual content to identify a following set of characters that follows a preceding set of characters most often as compared to other following sets of characters in the plurality of characters in the textual content;
   receiving, from a client device, an input text entered by the user as part of a search query, wherein the input text comprises a text character;
   determining, by the processing device, a predicted text to follow the input text, wherein the predicted text is based on the one or more sequential relationships between the plurality of characters in the textual content; and
   providing the search query including the input text and the predicted text to the client device.

2. The method of claim 1, wherein maintaining the data structure comprises:
   obtaining a document of the plurality of documents from a document repository;
   parsing the document to extract the textual content from the document; and
   storing the textual content in the data structure.

3. The method of claim 2, further comprising:
   generating a unique document identifier associated with a location of the document;
   determining a unique user identifier associated with the user; and
   storing the unique document identifier and the unique user identifier in the data structure with the textual content.

4. The method of claim 2, further comprising:
   performing one or more data processing operations on the textual content comprising at least one of removing punctuation characters from the textual content, converting uppercase characters to lowercase characters, or removing symbolic characters from the textual content.

5. The method of claim 1, further comprising:
   indexing the textual content and unique document identifier to generate a search index to be used by a search engine to process search queries of the textual content of the plurality of documents.

6. The method of claim 5, further comprising:
   receiving, from the client device, the search query to search the textual content of the plurality of documents associated with the user;
   identifying one or more unique document identifiers associated with textual content that matches the search query based on the search index; and
   providing the one or more unique document identifiers to the client device.

7. The method of claim 1, wherein the neural network comprises a recurrent neural network, and wherein determining the predicted text comprises:
   analyzing the input text using the recurrent neural network; and
   identifying one or more predicted characters predicted to follow the input text based on the recurrent neural network training.

8. A server computing system comprising:
   a memory; and
   a processing device operatively coupled to the memory, the processing device to:
      maintain a data structure comprising entries that are each associated with one of a plurality of stored documents associated with a user, wherein each entry comprises textual content from a document of the plurality of stored documents associated with the user, and wherein the textual content comprises a plurality of characters;
      determine an amount of textual content stored in the data structure associated with the user;
      responsive to determining that the amount of textual content stored in the data structure associated with the user meets a threshold, analyze the textual content of each entry in the data structure to identify one or more sequential relationships between the plurality of characters in the textual content, wherein analyzing the textual content comprises training a neural network using the textual content to identify a following set of characters that follows a preceding set of characters most often as compared to other following sets of characters in the plurality of characters in the textual content;
      receive, from a client device, an input text entered by the user as part of a search query, wherein the input text comprises a text character;
      determine a predicted text to follow the input text, wherein the predicted text is based on the one or more sequential relationships between the plurality of characters in the textual content; and
      provide the search query including the input text and the predicted text to the client device.

9. The server computing system of claim 8, wherein to maintain the data structure the processing device is to:
   obtain a document of the plurality of documents from a document repository;
   parse the document to extract the textual content from the document; and
   store the textual content in the data structure.

10. The server computing system of claim 9, wherein the processing device is further to:
   generate a unique document identifier associated with a location of the document;

determine a unique user identifier associated with the user; and store the unique document identifier and the unique user identifier in the data structure with the textual content.

11. The server computing system of claim 9, wherein the processing device is further to:

perform one or more data processing operations on the textual content comprising at least one of removing punctuation characters from the textual content, converting uppercase characters to lowercase characters, or removing symbolic characters from the textual content.

12. The server computing system of claim 8, wherein the processing device is further to:

index the textual content and unique document identifier to generate a search index to be used by a search engine to process search queries of the textual content of the plurality of documents.

13. The server computing system of claim 12, wherein the processing device is further to:

receive, from the client device, the search query to search the textual content of the plurality of documents associated with the user;

identify one or more unique document identifiers associated with textual content that matches the search query based on the search index; and provide the one or more unique document identifiers to the client device.

14. The server computing system of claim 12, wherein the neural network comprises a recurrent neural network, and wherein the processing device is further to:

analyze the input text using the recurrent neural network; and identify one or more predicted characters predicted to follow the input text based on the recurrent neural network training.

15. A non-transitory computer readable storage medium storing instructions that, when executed by a processing device of a client device, cause the processing device to:

maintain a data structure comprising entries that are each associated with one of a plurality of stored documents associated with a user, wherein each entry comprises textual content from a document of the plurality of stored documents associated with the user, and wherein the textual content comprises a plurality of characters;

determine an amount of textual content stored in the data structure associated with the user;

responsive to determining that the amount of textual content stored in the data structure associated with the user meets a threshold, analyze the textual content of each entry in the data structure to identify one or more sequential relationships between the plurality of characters in the textual content, wherein analyzing the textual content comprises training a neural network using the textual content to identify a following set of characters that follows a preceding set of characters most often as compared to other following sets of characters in the plurality of characters in the textual content;

receive, from a client device, an input text entered by the user as part of a search query, wherein the input text comprises a text character;

determine a predicted text to follow the input text, wherein the predicted text is based on the one or more sequential relationships between the plurality of characters in the textual content; and provide the search query including the input text and the predicted text to the client device.

16. The non-transitory computer readable storage medium of claim 15, wherein to maintain the data structure, the instructions cause the processing device to:

obtain a document of the plurality of documents from a document repository;

parse the document to extract the textual content from the document; and store the textual content in the data structure.

17. The non-transitory computer readable storage medium of claim 16, wherein the instructions cause the processing device further to:

generate a unique document identifier associated with a location of the document;

determine a unique user identifier associated with the user; and store the unique document identifier and the unique user identifier in the data structure with the textual content.

18. The non-transitory computer readable storage medium of claim 16, wherein the instructions cause the processing device further to:

perform one or more data processing operations on the textual content comprising at least one of removing punctuation characters from the textual content, converting uppercase characters to lowercase characters, or removing symbolic characters from the textual content.

19. The non-transitory computer readable storage medium of claim 15, wherein the instructions cause the processing device further to:

index the textual content and unique document identifier to generate a search index to be used by a search engine to process search queries of the textual content of the plurality of documents.

20. The non-transitory computer readable storage medium of claim 19, wherein the instructions cause the processing device further to:

receive, from the client device, the search query to search the textual content of the plurality of documents associated with the user;

identify one or more unique document identifiers associated with textual content that matches the search query based on the search index; and provide the one or more unique document identifiers to the client device.

21. The non-transitory computer readable storage medium of claim 15, wherein the neural network comprises a recurrent neural network, and wherein the instructions cause the processing device further to:

analyze the input text using the recurrent neural network; and identify one or more predicted characters predicted to follow the input text based on the recurrent neural network training.

* * * * *